US012809355B2

(12) United States Patent
Shao et al.

(10) Patent No.: US 12,809,355 B2
(45) **Date of Patent: *Nov. 24, 2026**

(54) SYSTEMS AND METHODS FOR GAS SUPPLY MANAGEMENT OF SMART GAS FULL-CYCLE

(71) Applicant: CHENGDU QINCHUAN IOT TECHNOLOGY CO., LTD., Chengdu (CN)

(72) Inventors: Zehua Shao, Chengdu (CN); Yaqiang Quan, Chengdu (CN); Yong Li, Chengdu (CN); Yuefei Wu, Chengdu (CN); Lei He, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 57 days.

This patent is subject to a terminal disclaimer.

(21) Appl. No.: 19/035,764

(22) Filed: Jan. 23, 2025

(65) Prior Publication Data

US 2025/0164973 A1 May 22, 2025

Related U.S. Application Data

(63) Continuation of application No. 18/755,635, filed on Jun. 26, 2024, now Pat. No. 12,242,252.

(30) Foreign Application Priority Data

Mar. 26, 2024 (CN) ......................... 202410352232.7

(51) Int. Cl.
*G05B 19/418* (2006.01)
*G16Y 10/35* (2020.01)
(Continued)

(52) U.S. Cl.
CPC ........ *G05B 19/41835* (2013.01); *G16Y 10/35* (2020.01); *G16Y 40/10* (2020.01); *H04L 67/12* (2013.01)

(58) Field of Classification Search
CPC .. G05B 19/41835; G16Y 10/35; G16Y 40/10; G16Y 20/30; G16Y 40/20;
(Continued)

(56) References Cited

U.S. PATENT DOCUMENTS 11,917,010 B2 2/2024 Shao et al.
2022/0108262 A1 4/2022 Cella et al.
2023/0265753 A1 * 8/2023 Almarhoon ............. E21B 43/00 703/10

* cited by examiner

*Primary Examiner* — Jason D Recek
(74) *Attorney, Agent, or Firm* — METIS IP LLC

(57) ABSTRACT

The present disclosure provides a system and method for gas supply management of smart gas full-cycle, the method includes: obtaining gas production data; determining base supervision data based on the gas production data; obtaining residual computing resources at a preset frequency; in response to determining that a sum of the reference resource consumption and the residual computing resources satisfying a preset requirement, performing operations including: generating and sending a control instruction to a gas company management platform; evaluating an importance degree of each of the all batches of gas in the target gas based on the target data and the gas production data of the target gas; and adjusting a gas supply volume of the at least one of all batches of gas in the target gas based on the importance degree of the each of the all batches of gas in the target gas and the target data.

8 Claims, 5 Drawing Sheets

(51) Int. Cl.
*G16Y 40/10* (2020.01)
*H04L 67/12* (2022.01)

(58) Field of Classification Search
CPC ....... G16Y 40/35; H04L 67/12; G06F 9/5027; G06N 20/00; G06Q 10/04; G06Q 10/06312; G06Q 10/0635; G06Q 10/0832; G06Q 10/0838; G06Q 50/06
See application file for complete search history.

243

SYSTEMS AND METHODS FOR GAS SUPPLY MANAGEMENT OF SMART GAS FULL-CYCLE

CROSS-REFERENCE TO RELATED APPLICATIONS

This application is a continuation of U.S. patent application Ser. No. 18/755,635, filed on Jun. 26, 2024, which claims priority to Chinese Patent Application No. 202410352232.7, filed on Mar. 26, 2024, the entire contents of which are hereby incorporated by reference.

TECHNICAL FIELD

The present disclosure relates to a field of gas supervision, and in particular, to systems and methods for gas supply management of smart gas full-cycle.

BACKGROUND

Currently, the gas full-cycle supervision mainly relates to stages of gas production, storage, transportation, distribution, sales, use, or the like. Different gas companies provide different batches of gas, and the above stages included in the full-cycles of the different batches of gas are not completely the same. For example, some gas batches of gas are directly delivered via pipes without a transportation stage or a distribution step, and the duration of the full-cycles of those batches of gas is also different. In response to determining that the same supervision scheme is applied to the different batches of gas, an unreasonable allocation of supervision resources may be caused, and problems such as production security, transportation security, and gas quality in all the stages of the gas full-cycle cannot be found timely.

Therefore, it is desirable to provide a system and method for gas supply management of smart gas full-cycle that is capable of implementing different supervision schemes for different batches of gas.

SUMMARY

According to one or more embodiments of the present disclosure, a method for gas supply management of smart gas full-cycle is provided, the method may be executed by a government safety supervision management platform of a system for smart gas full-cycle supervision, the method may include: obtaining a sum of a reference resource consumption and residual computing resources based on a government safety supervision sensor network platform; in response to determining that the sum of the reference resource consumption and the residual computing resources satisfying a preset requirement, performing operations including: generating and sending a control instruction to the gas company management platform, wherein the control instruction is configured to obtain target data, the target data includes an actual supervision parameter of the target gas, and the target gas includes all batches of gas under a current supervision; determining a hazard degree of each of the all batches of gas in the target gas based on the target data and the gas production data of the target gas; determining a user influence degree of the each of the all batches of gas in the target gas based on the gas production data of the target gas; determining the importance degree of the each of the all batches of gas in the target gas based on the hazard degree of the each of the all batches of gas and the user influence degree of the each of the all batches of gas; and adjusting a gas supply of the at least one of all batches of gas in the target gas based on the importance degree of the each of the all batches of gas in the target gas and the target data.

According to one or more embodiments of the present disclosure, a system for gas supply management of smart gas full-cycle is provided, the system may include a public user platform, a government safety supervision service platform, a government safety supervision management platform, a government safety supervision sensor network platform, a government safety supervision object platform, and a gas company sensor network platform, and the government safety supervision object platform may include a gas company management platform. The government safety supervision management platform may be configured to: obtain a sum of a reference resource consumption and residual computing resources based on a government safety supervision sensor network platform; in response to determining that the sum of the reference resource consumption and the residual computing resources satisfies a preset requirement, the government safety supervision management platform is further configured to: generate and send a control instruction to the gas company management platform, wherein the control instruction is configured to obtain target data, the target data includes an actual supervision parameter of the target gas, and the target gas includes all batches of gas under a current supervision; determine a hazard degree of each of the all batches of gas in the target gas based on the target data and the gas production data of the target gas; determine a user influence degree of the each of the all batches of gas in the target gas based on the gas production data of the target gas; determine the importance degree of the each of the all batches of gas in the target gas based on the hazard degree of the each of the all batches of gas and the user influence degree of the each of the all batches of gas; and adjust a gas supply of the at least one of the all batches of gas in the target gas based on the importance degree of the each of the all batches of gas in the target gas and the target data.

The beneficial effects of one or more embodiments of the present disclosure may include, but are not limited to, that: (1) each functional platform of the system for smart gas full-cycle supervision based on Internet of Things operates coordinately and regularly, which realizes informatization and smartness; (2) based on the production data and supervision data of each stage in the gas full-cycle, reasonable planning and allocation of supervision efforts and computing resources are performed in respect of the importance degree of different batches of gas, which may discover possible gas risks in each stage and reduce the likelihood of gas accidents occurring in the each stage of the gas full-cycle; (3) for different stages of the gas full-cycle, by using the method for smart gas full-cycle supervision, the risk of gas accidents that occur in different stages is estimated, and at the same time, for the stages with higher risks, a count of training samples corresponding to prediction layers of the stages with the higher risks are improved, an accuracy of an estimated hazard degree is improved, which effectively prevent the gas accidents from occurring and improve gas safety; (4) based on a current computing resource gap, one or more batches of gas in a portion of a stage with a lower-priority is suspended and the computing resource saved from suspension are allocated to a stage with a higher-priority, which may ensure that the gas system is capable of continuously supervising important gas data for a long period of time, safeguarding a normal operation of the gas system, and preventing the gas accidents from occurring; (5) based on adjustable computing resources allocated by a key supervision gas object, a count of users of a gas company corresponding to the key supervision gas object, a data collection frequency of a gas metering device is determined, so that a batch of gas that is in a use stage may obtain a better supervision.

BRIEF DESCRIPTIONS OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

Figure 1:
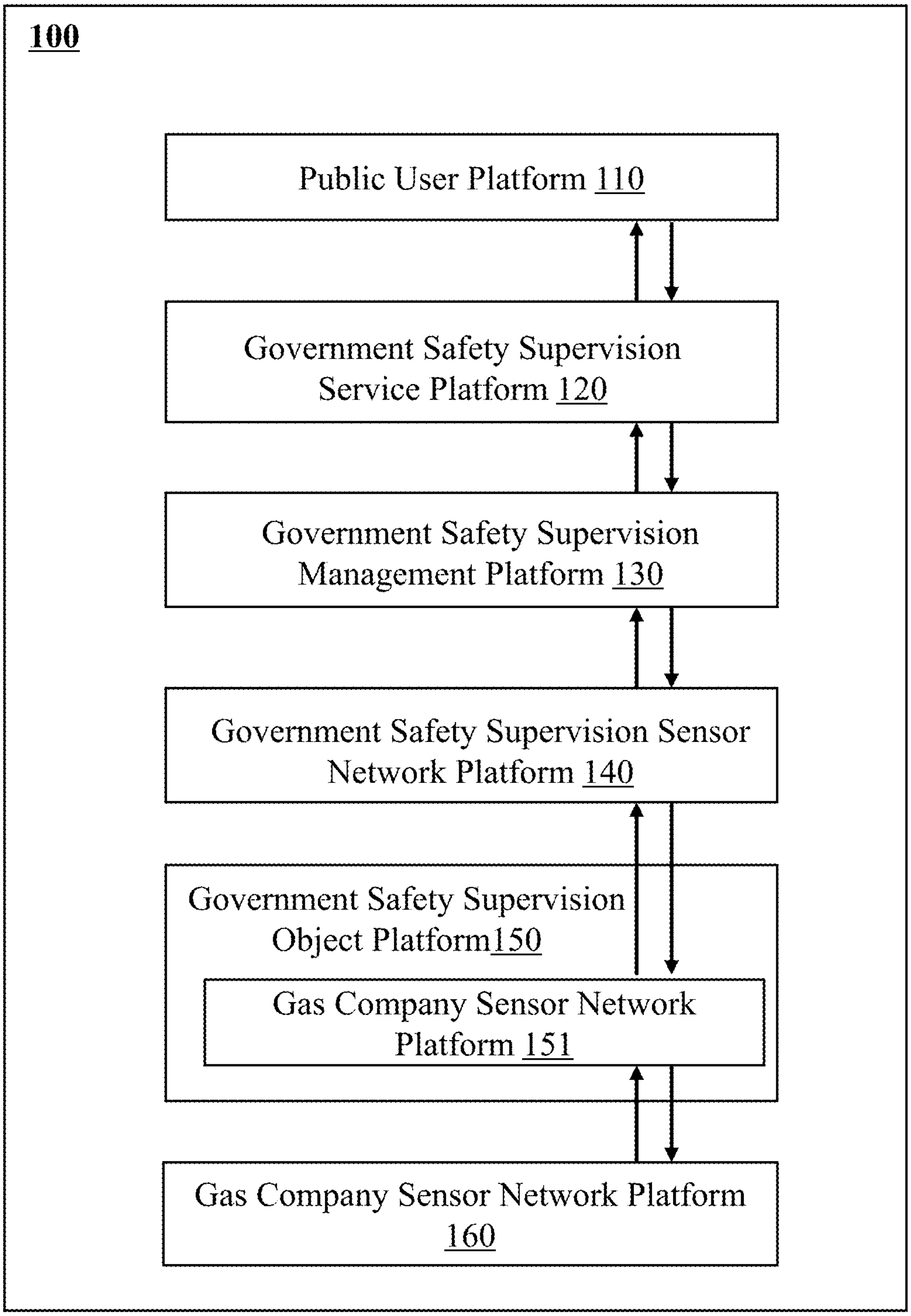
FIG. 1 is a schematic diagram illustrating a structure of a system for smart gas full-cycle supervision according to some embodiments of the present disclosure.

In order to more clearly illustrate the technical solutions of the embodiments of the present disclosure, the accompanying drawings to be used in the description of the embodiments will be briefly described below. Obviously, the accompanying drawings in the following description are only some examples or embodiments of the present disclosure, and it is possible for those skilled in the art to apply the present disclosure to other similar scenarios based on the accompanying drawings without creative labor. Unless otherwise apparent from the language or otherwise indicated, the same symbols in the drawings represent the same structure or operation.

FIG. 1 is a schematic diagram illustrating a structure of a system for smart gas full-cycle supervision according to some embodiments of the present disclosure.

In some embodiments, as shown in FIG. 1, the system for smart gas full-cycle supervision 100 may include a public user platform 110, a government safety supervision service platform 120, a government safety supervision management platform 130, a government safety supervision sensor network platform 140, a government safety supervision object platform 150, and a gas company sensor network platform 160, where the government safety supervision object platform 150 may include a gas company management platform 151. In some embodiments, the government safety supervision management platform 130 may obtain gas production data of at least one of all batches of gas to be supervised uploaded by the gas company management platform 151 in the government safety supervision object platform 150 based on the government safety supervision sensor network platform 140; determine base supervision data based on the gas production data; obtain residual computing resources at a preset frequency, and in response to determining that a sum of the reference resource consumption and the residual computing resources satisfies a preset requirement, generate and send a control instruction to the gas company management platform 151, evaluate an importance degree of each of the all batches of gas in the target gas based on the target data and the gas production data of the target gas; and adjust a gas supply volume of the at least one of the all batches of gas in the target gas based on the importance degree of the each of the all batches of gas in the target gas and the target data. More descriptions may be found in FIG. 2-FIG. 5 and the related descriptions thereof.

The public user platform 110 may be a platform configured to interact with a user. In some embodiments, the public user platform may obtain the needs of a public user and feed information back to the user. In some embodiments, the public user platform 110 may be configured as a terminal device. In some embodiments, the public user platform 110 may interact with the government supervision service platform 120 for information.

The government safety supervision service platform 120 may be a platform configured to provide related data of gas safety supervision to the public user. In some embodiments, the government safety supervision service platform 120 may interact with the government safety supervision management platform 130 for information.

The government safety supervision management platform 130 may be a platform used by the government safety management department configured to manage an operation of an entire system for smart gas full-cycle 100.

In some embodiments, the government safety supervision management platform 130 may execute a method for smart gas full-cycle supervision based on the Internet of Things.

The government safety supervision sensor network platform 140 may be a functional platform configured to manage a sensor communication of safety supervision information. The government supervision sensor network platform 140 may realize a sensing communication of perception information and a sensing communication of controlling information.

In some embodiments, the government safety supervision sensor network platform 140 may receive the gas production data uploaded by the gas company management platform 151 in the government safety supervision object platform 150 and send the gas production data to the government safety supervision management platform 130.

The government safety supervision object platform 150 may be a functional platform configured to generate perception information and execute controlling information. In some embodiments, the government safety supervision object platform 150 may include the gas company management platform 151.

The gas company management platform 151 may be configured to upload the gas production data and receive an instruction sent by the government safety supervision management platform 130.

The gas company sensor network platform 160 may be a functional platform configured to manage a sensor communication of gas operation.

More descriptions of the functions of the system for smart gas full-cycle supervision 100 may be found in FIG. 2-FIG. 5 and the related descriptions thereof.

Figure 2:
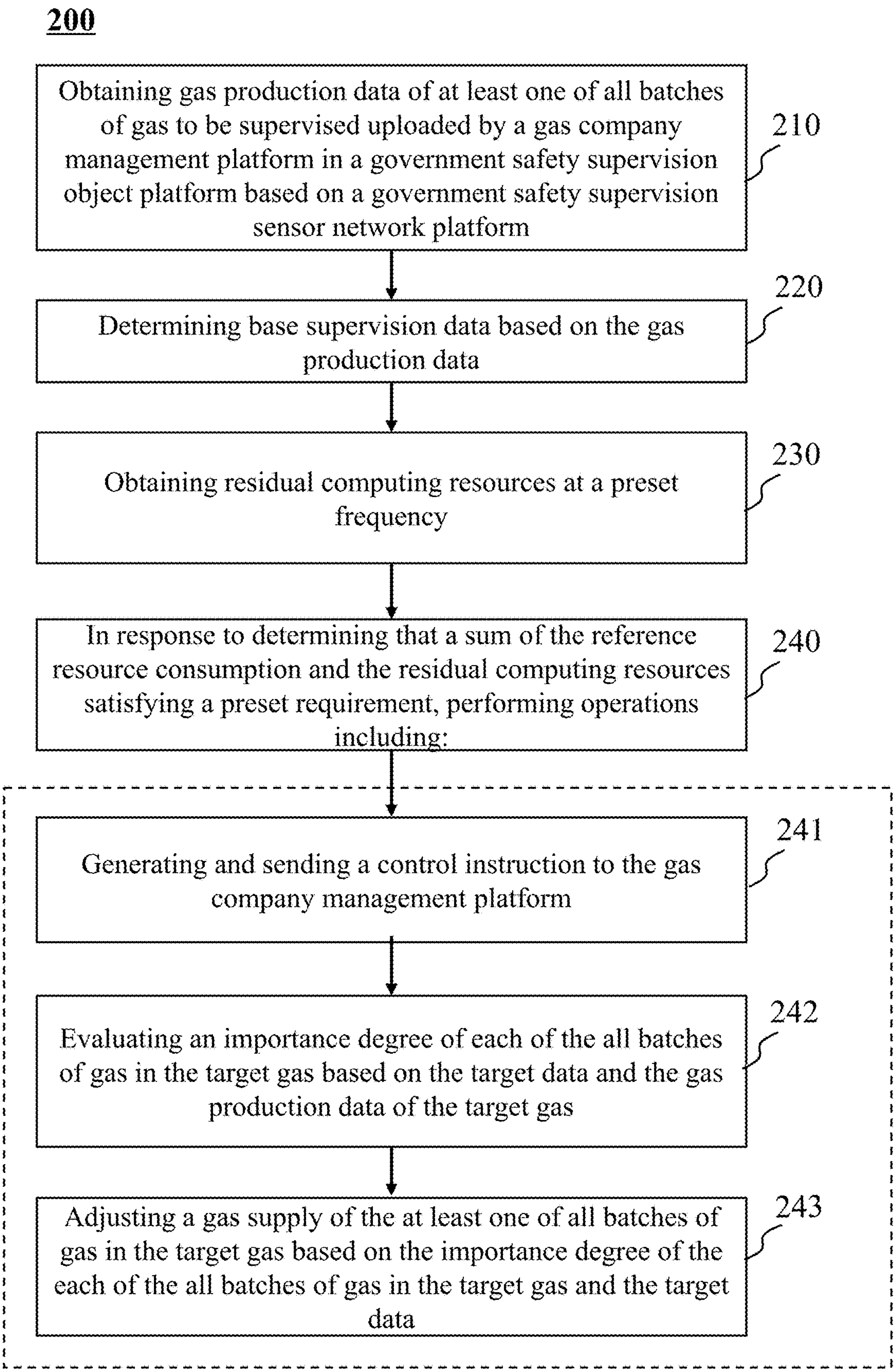
FIG. 2 is a flowchart illustrating an exemplary process for smart gas full-cycle supervision according to some embodiments of the present disclosure.

FIG. 2 is a flowchart illustrating an exemplary process for smart gas full-cycle supervision according to some embodiments of the present disclosure. As shown in FIG. 2, process 200 may include the operations described below. In some embodiments, process 200 may be performed by the government safety supervision management platform 130.

In 210, based on a government safety supervision sensor network platform 140, gas production data of at least one of all batches of gas to be supervised uploaded by a gas company management platform 151 in a government safety supervision object platform 150 may be obtained.

The gas production data may be data related to production of gas. The gas production data may include an estimated gas production volume, the basic information of the gas company, the production scale of the gas company, and a count of users of the gas company. The production scale of the gas company may include a count of production devices, a type of raw materials, or the like.

In some embodiments, the gas production data may be uploaded by the gas company management platform 151, and the government safety supervision sensor network platform 140 may send the received gas production data of the at least one of all batches of gas to be supervised to the government safety supervision management platform 130.

In some embodiments, different batches of gas may correspond to separate gas full-cycles. The different batches of gas may be under supervision at the same time. In some embodiments, when a batch of gas to be supervised starts production or is about to start production, the gas production data of the batch of gas to be supervised may be uploaded through the gas company management platform 151 and sent to the government safety supervision management platform 130. In some embodiments, after the gas production of the at least one of the all batches of gas to be supervised has started, the government safety supervision management platform 130 may supervise the gas to be supervised, at this point, the gas to be supervised may be determined as the target gas.

The gas full-cycle may refer to a life cycle of gas applications. The gas full-cycle may include a production stage of gas, a storage stage of gas, a transportation stage of gas, a distribution stage of gas, a sales stage of gas, and a use stage of gas.

In 220, base supervision data may be determined based on the gas production data.

The base supervision data refers to estimated data related to a supervision in each stage of the gas full-cycle. For example, the base supervision data may include an estimated gas production volume of the production stage, an estimated gas transportation volume of the transportation stage, an estimated gas use volume of the use stage, and the like. In some embodiments, when a batch of gas starts production or is about to start production, base supervision data corresponding to each stage in the gas full-cycle for the batch of gas may be estimated based on the gas production data of the batch of gas that is uploaded.

In some embodiments, the government safety supervision management platform 130 may determine the base supervision data in a plurality of feasible manners. For example, the government safety supervision management platform 130 may determine the base supervision data by vector matching.

For example, the government safety supervision management platform 130 may construct a first vector database, the first vector database may include a plurality of reference vectors and reference supervision data corresponding to the plurality of reference vectors. The government safety supervision management platform 130 may construct the plurality of reference vectors based on historical batches of gas production data, and the reference supervision data corresponding to the plurality of reference vectors may be obtained based on actual supervision data of the corresponding historical batches of gas in various stages of the gas full-cycle.

The government safety supervision management platform 130 may construct a target feature vector based on the batch of gas production data that is currently uploaded, match a reference vector that satisfies a first preset condition in a first vector database based on the target feature vector, and determine the reference supervision data corresponding to the reference vector that satisfies the first preset condition as the base supervision data of the batch of gas of that is currently uploaded. The preset condition may be that a vector distance between the reference vector and the target feature vector is minimized, etc., and the vector distance may include a Euclidean distance, a cosine distance, etc.

In some embodiments, the base supervision data may include a base supervision parameter and a reference resource consumption. The base supervision parameter may be a supervision-related parameter corresponding to each stage in the gas full-cycle. The base supervision parameter may include a type of data to be supervised corresponding to each stage and a data extraction frequency corresponding to each stage.

The type of data to be supervised may be a data type of gas-related data that needs to be supervised in different stages. The types of supervision data corresponding to different stages may be different. For example, in a production stage, the type of data to be supervised may include an actual gas production volume, a gas production device in actual operation, and an operating parameter thereof. As another example, in the transportation stage, the type of data to be supervised may include an actual gas transportation volume. As another example, in the use stage, the type of data to be supervised may include a total gas supply volume, or the like.

The data extraction frequency may refer to an extraction frequency of extracting a portion of the data for analysis from the data collected by a plurality of monitoring devices. The monitoring device may refer to an apparatus or device configured to monitor gas quality and a gas operation parameter, and the monitoring device may include a gas concentration monitoring device, a temperature sensor, a pressure sensor, a gas metering device, a gas leak detector, and the like.

The reference resource consumption may refer to computing resources that may be occupied when a batch of gas proceeds to a certain stage. The reference resource consumption corresponding to different stages may be different.

In 230, residual computing resources may be obtained at a preset frequency.

The residual computing resources may refer to the computing resources currently available for the system. In some embodiments, the government safety supervision management platform 130 may scan the system for smart gas full-cycle supervision 100 at a preset frequency, obtain currently-occupied computing resources and currently-unoccupied computing resources, and determine the currently-unoccupied computing resources as the residual computing resources.

The preset frequency may be a preset frequency for obtaining the residual computing resources. In some embodiments, the preset frequency may be determined based on at least one of a total estimated gas production volume, a total gas transportation volume, and a total gas supply volume.

In some embodiments, a preset frequency may be positively correlated with the total estimated gas production volume of all batches of gas under supervision. The government safety supervision management platform 130 may determine the preset frequency based on the total estimated gas production volume through a preset first correspondence. The first correspondence may include a correspondence between the total estimated gas production volume and the preset frequency, and the first correspondence may be determined based on a priori experience or historical data.

In some embodiments, the preset frequency may be positively correlated with a total gas transportation volume of all transportation stages that are currently under supervision. The government safety supervision management platform 130 may determine the preset frequency based on the total gas transportation volume through a preset second correspondence. The second correspondence may include a correspondence between the total gas transportation volume and the preset frequency, and the second correspondence may be determined based on a priori experience or historical data.

In some embodiments, a preset frequency may be positively correlated with a total gas supply volume for all use stages that are currently under supervision. The government safety supervision management platform 130 may determine the preset frequency based on the total gas supply volume through a preset third correspondence. The third correspondence may include a correspondence between the total gas supply volume and the preset frequency, and the third correspondence may be determined based on a priori experience or historical data.

It should be understood that the greater the total estimated gas production volume, the greater the total gas transportation volume, and the greater the total gas supply volume, the higher the risk of accidents occurring in the gas system, and the closer attention to residual computing resources is required to ensure proper supervision. When computing resources are scarce, the quality of supervision may be ensured and the risk of accidents occurring in the gas system may be reduced by timely adjusting the manner of supervision.

In 240, in response to determining that a sum of the reference resource consumption and the residual computing resources satisfies a preset requirement, the following operation 241-operation 243 are performed.

In some embodiments, a satisfaction of the requirement may be that the sum of the reference resource consumption is greater than the residual computing resources, i.e., the computing resources are scarce.

The sum of the reference resource consumption may refer to a sum of the reference resource consumptions of all batches of gas under a current supervision in the current stage. For example, in response to determining that all batches of gas under the current supervision include batch 1 gas (in the production stage), batch 2 gas (in the transportation stage), batch 3 gas (in the use stage), and batch 4 gas (in the use stage), and the reference resource consumption corresponding to the batch 1 gas, the batch 2 gas, the batch 3 gas, and the batch 4 gas are a, b, c, and d, respectively, at this time a sum of the reference resource consumption=a+b+c+d.

In 241, a control instruction may be generated and sent to the gas company management platform 151.

The control instruction is configured to control the gas company management platform 151 to obtain target data.

The target data may include an actual supervision parameter of the target gas, such as an actual gas supply volume of the target gas, or the like. The target gas may refer to all batches of gas under the current supervision. In some embodiments, the target data may be collected by a monitoring device.

In 242, an importance degree of each of the all batches of gas in the target gas may be evaluated based on the target data and the gas production data of the target gas.

The importance degree of gas may reflect an importance degree of a batch of gas in the target gas. It should be understood that the higher the importance degree of the batch of gas, the greater the influence that the accidents occur in the batch of gas on the user.

In some embodiments, the government safety supervision management platform 130 may evaluate an importance degree of each of the all batches of gas in the target gas based on the target data and the gas production data of the target gas in a plurality of feasible ways. For example, the government safety supervision management platform 13 may evaluate the importance degree of the batch of gas by querying a table of preset relationships between the target data, the gas production data of the target gas, and the importance degree. More descriptions of evaluating the importance degree may be found in FIG. 3 and the related descriptions thereof.

In 243, a gas supply volume of the at least one of all batches of gas in the target gas may be adjusted based on the importance degree of the each of the all batches of gas in the target gas and the target data.

The gas supply volume is a total amount of gas in each stage of the gas full-cycle. An initial gas supply volume may be obtained based on gas production data.

In some embodiments, the government safety supervision management platform 130 may adjust the gas supply volume of the at least one of the all batches of gas in the target gas in a plurality of feasible ways based on the importance degree of the each of the all batches of gas in the target gas and the target data. For example, the government safety supervision management platform 130 may obtain an adjustment parameter of the gas supply volume of the at least one of the all batches of gas by querying a table of preset adjustment parameter correspondences of the importance degree, the target data, and the preset adjustment parameter, and thereby adjusting the gas supply volume. More descriptions of adjusting the gas supply volume of the at least one of the all batches of gas in the target gas may be found in FIG. 5 and the related descriptions.

It should be understood that an adjustment of the gas supply volume may address the problem of high supervision loads in two main ways. On the one hand, the adjustment of the gas supply volume may adjust the amount of data to be supervised. For example, when a supervision load is too large for the gas system to bear, the gas supply volume may be appropriately reduced, i.e., a gas production rate and the gas production volume may be reduced, production devices and supervision devices that need to be supervised may be reduced, and at the same time, the amount of data that needs to be supervised is reduced, which reduces the consumption of computing resources and reduces the supervision load of the gas platform. On the other hand, the adjustment of the gas supply volume may enable the gas system to obtain a temporary buffer to avoid continuous high-load operation. For example, when the gas supply volume is reduced, the production of gas may be in turn reduced, and a total amount of gas put into the gas full-cycle may be reduced, and the amount of gas that needs to be analyzed and supervised in the gas full-cycle may be reduced, which is equivalent to enabling the gas system to obtain the temporary buffer and avoiding the gas system from operating at a high load all the time.

Figure 3:
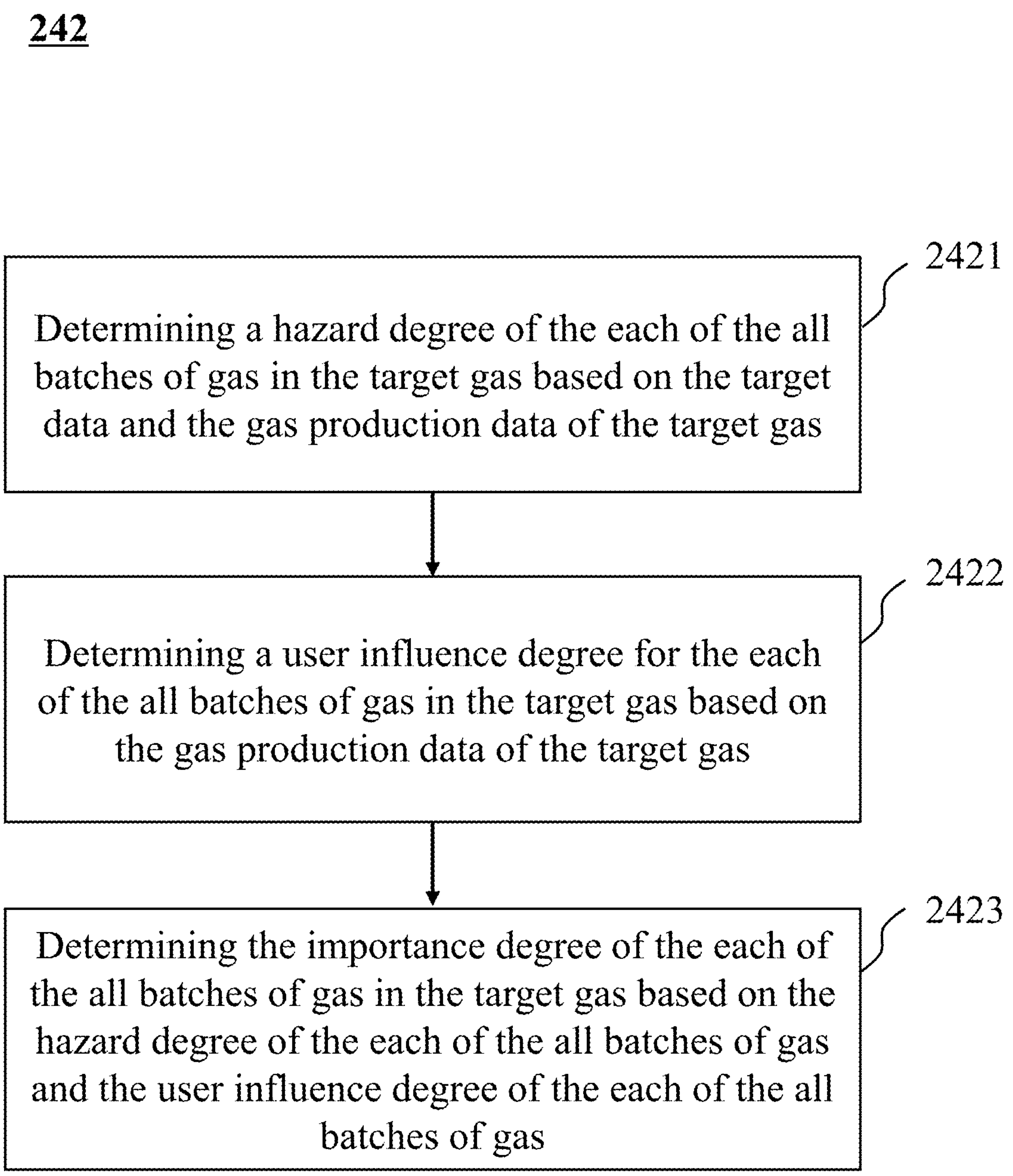
FIG. 3 is a flowchart for estimating an exemplary importance degree of target gas according to some embodiments of the present disclosure.

In some embodiments of the present, reasonable planning and allocation of supervision efforts and computing resources are performed with respect to the importance degree of different batches of gas based on the production data and the supervision data of each stage in the gas full-cycle, which may discover possible gas risks in each stage and reduce the likelihood of gas accidents occurring in the FIG. 3 is a flowchart for estimating an exemplary importance degree of target gas according to some embodiments of the present disclosure. As shown in FIG. 3, the operation 242 may include the operations described below. In some embodiments, the operation 242 may be performed by the government safety supervision management platform 130.

In 2421, a hazard degree of the each of the all batches of gas in the target gas may be determined based on the target data and the gas production data of the target gas.

More descriptions of the target data, the target gas, and the gas production data may be found in FIG. 2 and the related descriptions thereof.

The hazard degree may reflect the risk of the accidents that occur in a batch of gas. In some embodiments, for all batches of gas, the government safety supervision management platform 130 may determine a base hazard degree of each stage according to the environment in which the gas is located, and determine the hazard degree corresponding to each stage of the different batches of gas based on the base hazard degree in conjunction of features of each stage. The features of each stage may include an estimated gas production volume (corresponding to the production stage), a gas transportation volume (corresponding to the transportation stage), a gas supply volume (corresponding to the use stage), and the like, corresponding to each of the different batches of gas at each of the stages.

In some embodiments, the government safety supervision management platform 130 may determine a base hazard degree of a batch of gas at a stage by cluster analysis.

Taking the example of determining a base hazard degree of a gas of batch X in the production stage, the government safety supervision management platform 131 may construct a second vector database based on historical data. The second vector database may include a plurality of sub-databases, and each sub-database may correspond to each stage of the gas full-cycle, respectively.

For example, the sub-database may include a production sub-database, a storage sub-database, a transportation sub-database, a distribution sub-database, a sales sub-database, and a use sub-database. The production sub-database may store the gas of batch X and various historical batches of gas, and their corresponding historical gas production data, and the accident situations of the historical production stages. The accident situations of the historical production stage may include whether an accident actually occurred in the historical production stage and a severity level of the accident type. The severity level of accident types may be pre-divided, e.g. from 1 to 10, with the higher the level, the more serious the accident.

The government safety supervision management platform 130 may cluster all batches of gas in the production sub-database based on a preset count of clustering centers using the gas production data as a clustering index, to obtain a preset count of clusters. The government safety supervision management platform may, based on a cluster in which the gas of batch X is located, sum the severity degrees of the types of accidents in which the accidents occurred based on the accident situations of the historical production stages of the cluster, and thus determine the base hazard degree.

For example, the base hazard degree may be determined by the following equation (1):

$$\mu_0 = \frac{MX}{d \times R_{max}} \quad (1)$$

wherein $\mu_0$ denotes a base hazard degree of the gas of batch X in the production stage, and MX denotes a sum of the severity levels of the accident types, i.e., a sum of the severity levels of the accident types determined for all batches of gas in the cluster in which the gas of batch X are located, and d denotes a count of batches of gas included in the cluster, and $R_{max}$ denotes a maximum value of the severity level of the accident type. The maximum value of the severity level of the accident type may be a maximum value of a pre-divided severity level.

For example, when determining the base hazard degree corresponding to a batch of gas in the production stage, the severity level of the accident type is from 1 to 10, where 10 is the most severe. In response to determining that there are a total of 15 batches of gas in the cluster in which the batch of gas is located, in which 3 accidents have occurred, and the severity levels of the accident type may be 3, 1, and 2, respectively, the production stage may correspond to a $$\text{base hazard degree of} = \frac{3+1+2}{15 \times 10} = 4\%.$$

In some embodiments, the government safety supervision management platform 131 may adjust the base hazard degree to obtain a hazard degree. For example, the hazard degree may be determined based on the following equation (2):

$$\mu = \mu_0 \times (1 + \delta) \quad (2)$$

wherein μ denotes a hazard degree of gas of batch X at the production stage, and $\mu_0$ denotes the base hazard degree of gas of batch X in the production stage, and δ denotes a production adjustment factor.

The production adjustment factor may characterize an influence of gas production data on the hazard degree. The production adjustment factor may be determined based on a preset fourth correspondence between the estimated gas production volume of the gas of batch X and the production adjustment factor, and the preset fourth correspondence may reflect a positive correspondence between the production adjustment factor and the estimated gas production volume of the gas of batch X. The fourth correspondence may be determined based on a priori experience or historical data.

The production adjustment factors of the production stages corresponding to different batches of gas may be different. For example, in response to determining that the gas of batch X and a gas of batch Y are both in the production stage, a correspondence between the respective gas estimated production volume and the production adjustment factor may be preset separately to determine the respective production adjustment factor and thereby determining the respective hazard degree.

In some embodiments, the hazard degree of the gas of batch X in other stages of the full-cycle may be determined in a similar manner as the hazard degree of the gas of batch X in the production stage. For example, it may be determined based on equation (2) above, the production adjustment factor may correspond to each stage, and a storage adjustment factor, a transportation adjustment factor, a distribution adjustment factor, a sales adjustment factor, or a use stage adjustment factor may be replaced with the production adjustment factor. The storage adjustment factor may be positively correlated with a gas storage volume of the gas of batch X, the transportation adjustment factor may be positively correlated with a gas transportation volume of the gas of batch X, the distribution adjustment factor may be positively correlated with a gas distribution volume of the gas of batch X, the sales adjustment factor may be positively correlated with a gas sales volume of the gas of batch X, and the use stage adjustment factor may be positively correlated with a gas supply volume of the gas of batch X.

In some embodiments, the hazard degree may also be determined by a machine learning model.

In some embodiments, the government safety supervision management platform 130 may predict a hazard degree of each of the all batches of gas in the target gas through a risk model. The risk model may be a machine learning model.

Figure 4:
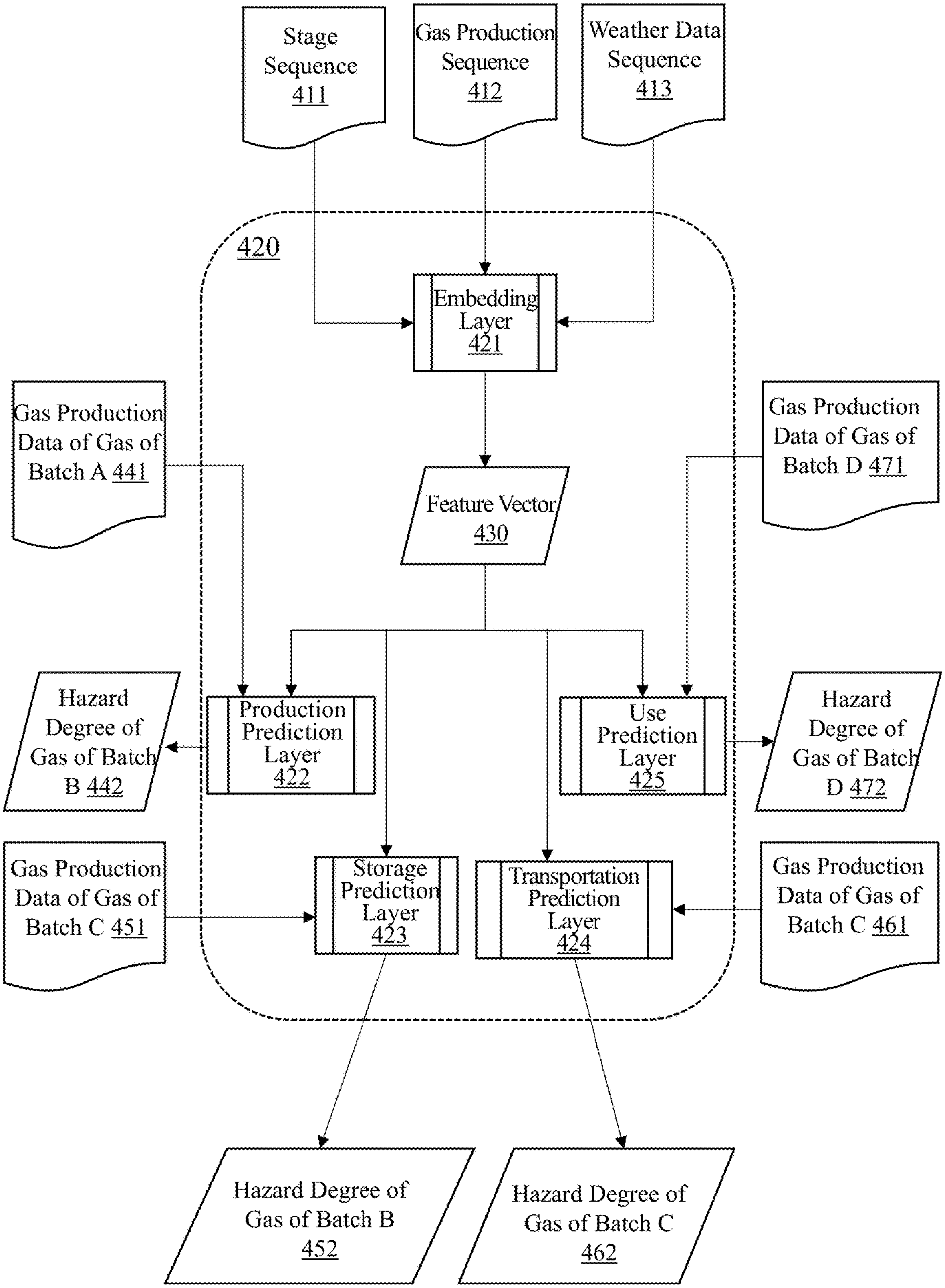
FIG. 4 is a schematic diagram illustrating an exemplary risk model according to some embodiments of the present disclosure.

FIG. 4 is a schematic diagram illustrating an exemplary risk model according to some embodiments of the present disclosure.

The risk model may be a model configured to predict a hazard degree. As shown in FIG. 4, the risk model 420 may include an embedding layer 421, a production prediction layer 422, a storage prediction layer 423, a transportation prediction layer 424, and a use prediction layer 425.

The risk model 420 may be a machine learning model. For example, the embedding layer 421 may be a neural network architecture (transformer) based on an attention mechanism configured to process sequence data. The production prediction layer 422, the storage prediction layer 423, the transportation prediction layer 424, and the use prediction layer 425 may be one of a Deep Neural Network (DNN) model or a Support Vector Machine (SVM) model, or a combination thereof.

In some embodiments, an input of the embedding layer may include a stage sequence 411, a gas production data sequence 412, and weather data 413; an output may include a feature vector 430.

The stage sequence 411 may be a sequence consisting of the current stages of all batches of gas under a current supervision. It should be noted that the stage sequence 411 does not include the distribution stage and the sales stage. Considering that the effect of monitoring the distribution stage and the sales stage is not obvious, and that the effect is reflected in subsequent financial reconciliations and the like rather than at the current time, these two stages may be not supervised when the computing resources are insufficient. In addition, most of the accidents in these two stages are caused by human operation, which is more random and may be counted by historical data. For example, in response to determining that a gas of batch A is in the production stage, a gas of batch B is in the storage stage, a gas of batch C is in the transportation stage, and a gas of batch D is in the use stage, a stage sequence may be {(A, production), (B, storage), (C, transportation), (D, use)}.

The gas production data sequence 412 may be a sequence consisting of gas production data for all batches of gas under a current supervision. More descriptions of the gas production data may be found in FIG. 2 and the related descriptions thereof.

The weather data sequence 413 may be a sequence consisting of weather-related data. The weather data may be obtained and manually or automatically entered into the gas system based on a third-party platform, for example, the third-party platform may include weather forecasts.

In some embodiments, an input of the production prediction layer 422 may include the feature vector 430 and gas production data of the gas of batch A 441 that is in the production stage; an output of the production prediction layer 422 may include a hazard degree of the gas of batch A 442 that is in the production stage. The gas production data of the gas of batch A 441 which is in the production stage may be obtained from the target data of the gas of batch A that is in the production stage obtained at a recent time. More descriptions of the gas production data may be found in FIG. 2 and the related descriptions.

In some embodiments, a first training sample for generating the prediction layer 422 may be gas production data for a historical production stage batch of gas, and a first label may be an accident situation of the historical production stage corresponding to the first training sample. In response to determining that no accident occurs, the label may be 0. In response to determining that an accident occurs, the first training label may be determined based on a severity level of the accident type. For example, the first training label=the sum of the severity level of the accident type÷the maximum value of the severity level of the accident type×100%. More descriptions of the sum of the severity level of the accident type and the maximum value of the severity level of the accident type may be found in FIG. 3 and the related descriptions thereof.

In some embodiments, an input of the storage prediction layer 423 may include the feature vector 430 and storage data of the gas of batch B 451 that is in the storage stage; an output of the storage prediction layer 423 may include a hazard degree of the gas of batch B 452.

The storage data may reflect information related to storage of gas. The storage data may include a location and a storage distribution of a gas storage site, the environment of the gas storage site, a safety facility level of the gas storage site, or the like. The storage data of the gas of batch B 451 that is in the storage stage may be obtained based on the target data of the gas of batch B that is obtained at a recent time.

In some embodiments, a second training sample of the storage prediction layer 423 may be storage data for a historical storage stage batch of gas, and a second label may be an accident situation of the historical storage stage corresponding to the second training sample. In response to determining that no accident occurs, the label may be 0. In response to determining that an accident occurs, the second training label may be determined based on a severity level of the accident type. For example, the second training label=the sum of the severity level of the accident type÷the maximum value of the severity level of the accident type×100%. More descriptions of the sum of the severity level of the accident type and the maximum value of the severity level of the accident type may be found in FIG. 3 and the related descriptions thereof.

In some embodiments, inputs of the transportation prediction layer 424 may include the feature vector 430 and transportation data of the gas of batch C 461 that is in the transportation stage; an output of the transportation prediction layer 424 may include a hazard degree the of the gas of batch C 462.

The transportation data may reflect information related to the transportation of gas. The transportation data may include a transportation mode of gas, a current transportation time, a current transportation path of gas, a target gas transportation volume, and the like. The transportation data of the gas of batch C that is in the transportation stage may be obtained based on the target data of the gas of batch C that is obtained at a recent time.

In some embodiments, a third training sample of the transportation prediction layer 424 may be transportation data for a historical transportation stage batch of gas, and a third label may be an accident situation of a historical transportation stage corresponding to the third training sample. In response to determining that no accident occurs, the label may be 0. In response to determining that an accident occurs, the third training label may be determined based on a severity level of the type of accident. For example, the third training label=the sum of the severity level of the accident type÷the maximum value of the severity level of the accident type×100%. More descriptions of the sum of the severity level of the accident type and the maximum value of the severity level of the accident type may be found in FIG. 3 and the related descriptions thereof.

In some embodiments, an input of the use prediction layer 425 may include the feature vector 430, use data of the gas of batch D 471 that is in the use stage; the output of the use prediction layer 425 may include a hazard degree of the gas of batch D 472.

The use data may reflect information related to the use of gas. The use data may include a current gas use period, a current gas supply volume, and the like. The use data of the gas of batch D that is in the use stage may be obtained based on the target data of the gas of batch D that is obtained at a recent time.

In some embodiments, a fourth training sample of the use prediction layer 425 may be use data for a historical transportation stage batch of gas, and a fourth label may be an accident situation of a historical transportation stage corresponding to the fourth training sample. In response to determining that no accident occurs, the label may be 0. In response to determining that an accident occurs, the fourth training label may be determined based on a severity level of the type of accident. For example, the fourth training label=the sum of the severity level of the accident type÷the maximum value of the severity level of the accident type× 100%. More descriptions of the sum of the severity level of the accident type and the maximum value of the severity level of the accident type may be found in FIG. 3 and the related descriptions thereof.

In some embodiments, the risk model may be obtained by training the embedding layer with the production prediction layer, the storage prediction layer, the transportation prediction layer, and the use prediction layer by joint training. The training samples may include a sample stage sequence, a sample gas production data sequence, a sample weather data sequence, a first training sample, a second training sample, a third training sample, and a fourth training sample, and the labels may include a first label, a second label, a third label, and a fourth label.

A loss function obtained by joint training may include 4 loss functions corresponding to an initial production prediction layer, an initial storage prediction layer, an initial transportation prediction layer, and an initial use prediction layer, respectively. The parameters of the initial embedding layer may be updated based on the 4 loss functions, while the parameters of the initial production prediction layer, the initial storage prediction layer, the initial transportation prediction layer, and the initial use prediction layer are updated based on merely a single loss function corresponding to each of the initial production prediction layers, the initial storage prediction layer, the initial transportation prediction layer, and the initial use prediction layer. The model training may be completed when the 4 loss functions satisfy the preset conditions, and the trained risk model is obtained. The preset condition may be that all 4 loss functions converge, a count of iterations reaches the threshold, and so on.

In some embodiments, the risk model may include four prediction layers, and a count of training samples of each of the four prediction layers may be correlated with an estimated hazard degree of a preset stage in a full-cycle corresponding to each of the four prediction layers, respectively.

The estimated hazard degree may be an estimated risk level of a gas accident occurring at each stage. In some embodiments, the government safety supervision management platform 130 may determine the estimated hazard degree based on a severity level of an accident type.

Taking the production stage as an example, the government safety supervision management platform 130 may query the production sub-database in the second vector database to determine the estimated hazard degree.

In some embodiments, the estimated hazard degree may be positively correlated with the sum of the severity levels of the types of accidents corresponding to all gas batches in which the accidents occurred. For example, the estimated hazard degree may be determined by the following equation (3):

$$\tilde{\mu} = \frac{M}{f \times R_{max}} \tag{3}$$

wherein $\tilde{\mu}$ denotes an estimated hazard degree of the production stage, and M denotes a sum of the severity levels of the accident types, i.e., the sum of the severity levels of the accident types determined for all batches of gas in a production sub-database, and f denotes a sum of a count of gas batches in a production sub-database, and $R_{max}$ denotes a maximum value of the severity level of the accident type. The production sub-database may include a plurality of batches of gas. More descriptions of the production sub-database may be found in FIG. 3 and the related descriptions thereof.

In some embodiments, the estimated hazard degree of each stage may have a positive correspondence with a count of training samples of its corresponding prediction layer. For example, a ratio of the count of training samples of the prediction layer corresponding to each stage may be the same as a ratio of the estimated hazard degree of each stage.

In some embodiments of the present disclosure, for different stages of the gas full-cycle, the risk of gas accidents that occur in different stages may be estimated, for the stages with higher risks, a count of training samples corresponding to prediction layers of the stages with the higher risks may be improved, an accuracy of the estimated hazard degree may be improved, which may effectively prevent the gas accidents from occurring and improves gas safety.

In some embodiments of the present disclosure, by determining the hazard degree corresponding to each gas stage through a machine learning model, the accuracy of the prediction results can be improved, and training computations on batches of gas that are in different gas stages may be performed, separately, which can improve an efficiency of processing gas data and reducing the computing load.

In 2422, a user influence degree of the each of the all batches of gas in the target gas may be determined based on the gas production data of the target gas.

The user influence degree may reflect a degree of influence on gas users when an accident occurs in a batch of gas. In some embodiments, the government safety supervision management platform 131 may determine the user influence degree based on a total count of users of the gas company corresponding to the current batch of gas in which the gas accident occurred and the total count of users of all gas companies in the target gas. For example, the user influence degree may be a ratio of the count of users of the gas company corresponding to the current batch of gas in which the gas accident occurred to the total count of the users of the all gas companies in the target gas.

In 2423, the importance degree of the each of the all batches of gas in the target gas may be determined based on the hazard degree of the each of the all batches of gas and the user influence degree of the each of the all batches of gas.

More descriptions of the importance degree may be found in FIG. 2 and the related descriptions thereof.

In some embodiments, the government safety supervision management platform 130 may determine the importance degree based on the hazard degree and the user influence degree in a variety of ways. For example, the government safety supervision management platform 130 may weight and sum the hazard degree and the user influence degree to obtain the importance degree. The weights may be set manually based on experience or historical data.

In some embodiments, an influence of the hazard degree of the each of the all batches of gas in the target gas on the importance degree of the each of the all batches of gas may be positively correlated with a count of historical accidents that occur in the gas company to which the each of the all batches of gas in the target gas belongs. In some embodiments, a weight corresponding to the hazard degree of a weighted sum of the hazard degree and the user influence degree of a batch of gas in the target gas may be positively correlated with a count of historical accidents that occur in the gas company to which the batch of gas belongs.

In some embodiments of the present disclosure, in view of a relationship between the count of historical accidents that occur in the gas company to which each of the all batches of gas in the target gas belongs and the influence of the hazard degree of each of the all batches of gas in the target gas on the importance degree, an accuracy of determining the weights corresponding to the hazard degree may be improved, and such that an accuracy of the prediction results of the importance degree of each of the all batches of gas in the target gas may be improved.

In some embodiments of the present disclosure, a hazard degree and user influence degree each of the all batches of gas in the target gas may be determined based on target data and the gas production data corresponding to the target gas, such that the importance degree of the each of the all batches of gas in the target gas may be determined, the risk caused by the gas accidents and the influence on user may be considered, which may evaluate the importance degree of the batch of gas more comprehensively and adjust scale of supervision timely to prevent the occurrence of the gas accidents.

Figure 5:
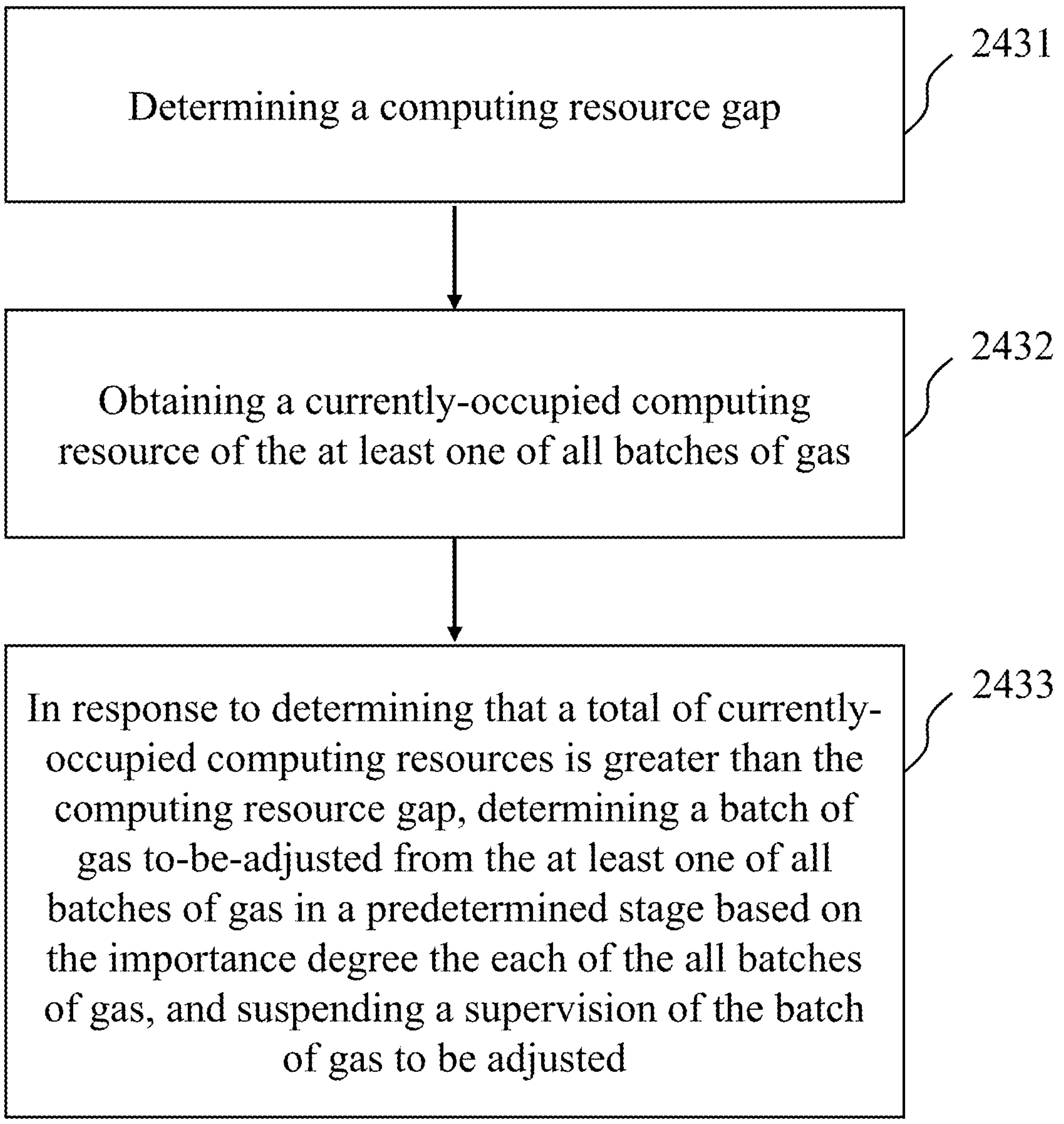
FIG. 5 is a flowchart for adjusting an exemplary gas supply volume according to some embodiments of the present disclosure.

FIG. 5 is a flowchart for adjusting an exemplary gas supply volume according to some embodiments of the present disclosure. As shown in FIG. 5, an operation 243 may include the operations described below. In some embodiments, the operation 243 may be performed by the government safety supervision management platform 130.

In 2431, a computing resource gap may be determined.

The computing resource gap may be a difference between reference resource consumption and residual computing resources. More specific descriptions of the reference resource consumption and the residual computing resources may be found in FIG. 2 and the related descriptions thereof.

In 2432, a currently-occupied computing resource of the at least one of all batches of gas may be obtained.

The currently-occupied computing resource may be a computing resource that is currently occupied by at least one batch of gas that is in a particular stage. The particular stage may include the sales stage and the distribution stage. In some embodiments, the government safety supervision management platform 130 may obtain the computing resources occupied by the at least one batch of the target gas that is in the particular stage. For example, the government safety supervision management platform 130 may obtain a gas of batch Q and a gas of batch L that are in the particular stage and obtain computing resources Q1 occupied by the gas of batch Q and computing resources L1 occupied by the gas of batch L in the current supervision. More descriptions of obtaining the currently-occupied computing resources may be found in FIG. 2 and the related descriptions thereof.

In 2433, in response to determining that a total of currently-occupied computing resources is greater than the computing resource gap, a batch of gas to be adjusted from the at least one of all batches of gas in a predetermined stage may be determined based on the importance degree the each of the all batches of gas, and a supervision of the batch of gas to be adjusted is suspended.

The batch of gas to be adjusted may be a batch of gas that is temporarily not being supervised. In some embodiments, the government safety supervision management platform 130 may determine the batch of gas to be adjusted based on the importance degree of gas currently in a particular stage.

Exemplarily, at least one batch of gas that is currently in the particular stage may be sorted in order of importance degree from lowest to highest. Starting with a gas of batch E1 with the lowest importance degree, the total of computing resources the gas of batch E1 occupies is compared to the computing resource gap, in response to determining that the total of computing resources the gas of batch E1 occupies is less than the computing resource gap, it indicated that the gas of batch E1 is not able to compensate the computing resource gap, then a gas of batch E2 with the second-lowest importance degree is selected for comparison, the total of computing resources (i.e., a summed value) occupied by the gas of batches E1 and E2 is compared to the computing resource gap, in response to determining that a sum of computing resources occupied by the Gas of batches E1 and E2 is still less than the computing resource gap, then a gas of batch E3 with the third lowest importance degree is continued to select for comparison, and the above operations are repeated until the total amount of computing resources occupied by the selected batch of gas is not less than the computing resource gap, then the operation is stopped, and the batch of gas selected at this time is determined as the batch as gas to be adjusted.

In some embodiments, in response to determining that the total of currently-occupied computing resources is not greater than the computing resource gap, updating a data extraction frequency of each of residual batches of gas based on the importance degrees of the residual batches of gas and the residual computing resources.

More specific descriptions of the data extraction frequency may be found in FIG. 2 and the related descriptions thereof.

The residual batches of gas may be all of the remaining batches of gas under the current supervision, except for some batches of gas that are in the particular stage.

In some embodiments, the government safety supervision management platform 130 may determine the available computing resources of each of the residual batches of gas, and determine an updated data extraction frequency based on the available computing resources and the current data extraction frequency.

The total of available computing resources for each of the residual batches of gas may be the residual computing resources of a current system. The available computing resources of the residual batches of gas are positively correlated with the importance degree of each residual batches of gas, and negatively correlated with the sum of the importance degrees of each of all residual batches of gas.

For example, the available computing resources may be determined by the following equation (4):

$$P_j = \frac{t_j}{N} \times P_{re} \tag{4}$$

wherein $P_j$ denotes the available computing resources corresponding to the remaining gas of batch j, $t_j$ denotes an importance degree corresponding to the remaining gas of batch j, N denotes a sum of the importance degrees of the remaining gas of batch j including the batch is the sum of importance degrees of the residual batches of gas including the gas of batch j, and $P_{re}$ denotes the residual computing resources of the current system.

In some embodiments, the updated data extraction frequency may be positively correlated with the current data extraction frequency, positively correlated with the available computing resources corresponding to the batch of gas, and negatively correlated with the currently-occupied computing resources of the batch of gas.

For example, the updated data extraction frequency may be determined by the following equation (5):

$$f_j = \frac{p_j}{Q_j} \times f_{j0} \tag{5}$$

wherein $f_j$ denotes the remaining gas of batch j corresponding to the updated data extraction frequency, and $P_j$ denotes the available computing resources corresponding to the remaining gas of batch j, $Q_j$ denotes the currently-occupied computing resources corresponding to the remaining gas of batch j, and $f_{j0}$ denotes the current data extraction frequency for the remaining gas of batch j. The results may be rounded down.

In some embodiments of the present disclosure, the computing resources occupied by each of the residual batches of gas may be reallocated by adjusting the data extraction frequency, which may not only relieve the computing load of the system, but may also ensure that the important gas stages are always under supervision and effectively prevent the occurrence of gas accidents.

In some embodiments, in response to determining that the total of the currently-occupied computing resources is not greater than the computing resource gap, a production parameter of the gas in production may be updated based on the computing resource gap and an importance degree of the gas in production, and an updated production parameter may be sent to a gas production device of the gas in production.

The production parameter may be an operation parameter related to a gas production device. The production parameter may include a count of production devices in operation, or the like. In some embodiments, the production parameter may be determined based on a priori experience or historical data. The gas in production may refer to a gas that is in the production stage.

In some embodiments, the government safety supervision management platform 130 may update the production parameter based on the computing resource gap and an importance degree of the gas in production.

In some embodiments, the government safety supervision management platform 130 may allocate the computing resource gap to the gas in production according to the importance degree of the gas in production.

The computing resource gap allocated to a batch of gas in production may be understood that the batch of gas in production needs to reduce the operation of some of its own to free up this overloaded computing space.

The computing resource gap allocated to the gas in production may be positively correlated with the importance degree of the gas in production and negatively correlated with the sum of the importance degrees of all gases in production. For example, the computing resource gap to which the gas in production is allocated may be determined by the following equation (6):

$$q_j = \frac{T_j}{T} \times Q_0 \tag{6}$$

wherein $q_j$ denotes a computing resource gap allocated to a gas of batch j in production, $T_j$ denotes an importance degree corresponding to the gas of batch j in production, T denotes a sum of the importance degrees of all gas in production, and $Q_0$ denotes a computing resource gap.

In some embodiments, the updated production parameter for a batch of gas in production may be positively correlated with the count of production devices in current actual operation for that batch of gas in production.

For example, the updated production parameter may be determined by the following equation (7):

$$\beta' = s \times \left(1 - \frac{q_j}{Q_j}\right) \tag{7}$$

wherein β' denotes an updated production parameter corresponding to a gas of batch j in the gas in production, $q_j$ denotes a computing resource gas allocated to the gas of batch j in the gas in production, $Q_j$ denotes a currently-occupied computing resource corresponding to the gas of batch j in production, and s denotes a count of production devices actually in operation. The results may be rounded down.

In some embodiments of the present disclosure, a count of production devices in production may be adjusted by adjusting the production parameter, and thus the gas supply volume may be adjusted, which not only relieves the computing load of the system, but also ensures that the important gas stages are always under supervision and effectively prevents the occurrence of gas accidents.

In some embodiments of the present disclosure, a portion of the gas batches in a stage with a lower priority degree may be suspended based on the current computing resource gap, and the computing resources saved from the suspension may be allocated to a stage with a higher priority degree, which may ensure that the gas system is capable of continuously supervising important gas data for a long period of time, safeguarding a normal operation of the gas system, and preventing the gas accidents from occurring.

In some embodiments, in response to determining that the sum of the reference resource consumption does not satisfy a preset requirement, the government safety supervision management platform 130 may determine the importance degree of the at least one of all batches of gas higher than an importance threshold as a key supervision gas object; and, in response to determining that the key supervision gas object is in a production stage, the government safety supervision management platform 130 may increase a data collection frequency of a gas concentration detection device for the at least one key supervision gas object that is in the production stage.

More specific descriptions of satisfying the preset requirement may be found in FIG. 2 and the related descriptions thereof. The preset requirement is not satisfied may mean that the reference resource consumption is less than the computing resource gap, i.e. the computing resources are sufficient at this time.

The key supervision gas object may refer to at least one batch of gas with an importance degree higher than an importance degree threshold. The importance degree threshold may be a minimum value of an importance degree of the at least one batch of gas as a key supervision gas object. In some embodiments, the importance degree threshold may be determined based on a priori experience or historical data.

In some embodiments, the importance degree threshold may be determined based on at least one of weather conditions, a current time period, and the total count of users of all gas companies currently under supervision. The weather conditions may be obtained based on a third-party platform, such as, for example, a weather forecast. The current time period may be obtained based on a timing device that comes with the system. The total count of users of all gas companies currently under supervision may be uploaded by the gas company management platform 151.

In some embodiments, the worse the weather conditions are, the lower the importance degree threshold may be, such that the supervision in the case of poor weather conditions may be improved and the risk caused by the weather to the production stage of gas, the transportation stage of gas, and the use stage of gas. The poor weather conditions may refer to that the temperature is lower than a preset temperature threshold or the temperature is higher than the preset temperature threshold, the poor weather condition may also refer to the precipitation is greater than a preset precipitation threshold.

In some embodiments, peak gas use hours may be preset in advance, and an importance degree threshold of the peak gas use hours may be lower than an importance degree threshold of other hours, thereby enhancing the supervision of the peak gas use hours and reducing the risk that may increase due to an increase of gas use volume.

In some embodiments, the total count of users of all gas companies currently under supervision may be negatively correlated with the importance degree threshold, thereby reducing the risk of increased accidents that may occur due to a large count of users through enhancing the supervision.

In some embodiments of the present disclosure, the influence of the weather conditions and the count of gas users on the importance degree threshold may be considered, which may help obtain a more accurate importance degree threshold and improve a supervision effect.

The data collection frequency may be a frequency at which the gas concentration detection device collects data. In some embodiments, the data collection frequency may be determined based on manual determination. The gas concentration detection device may include a gas concentration detector or the like.

In some embodiments, the government safety supervision management platform 130 may determine an updated data collection frequency of the gas concentration detection device for each key supervision gas object based on the adjustable computing resources and the importance degree of the key supervision gas object.

The adjustable computing resource may be a difference between a sum of the residual computing resources and the reference resource consumption of the current system.

In some embodiments, the government safety supervision management platform 130 may allocate the adjustable computing resources to each key supervision gas object according to a ratio of the importance degree of the key supervision gas object to the sum of the importance degrees of all the key supervision gas objects.

In some embodiments, the government safety supervision management platform 130 may determine the updated data collection frequency of the gas concentration detection device for each key supervision object based on a preset correspondence between the adjustable computing resources and the data collection frequency of the gas concentration detection device. The adjustable computing resources are positively correlated with the data collection frequency of the gas concentration detection device.

In some embodiments, in response to determining that at least one key supervision gas object is in use, the government safety supervision management platform 130 may increase a data collection frequency for a gas metering device of the at least one key supervision gas object that is in a use stage.

The gas metering device may be a device configured to measure data related to gas, and gas metering devices may include gas meters and the like.

In some embodiments, the government safety supervision management platform 130 may determine an updated data collection frequency of the gas metering device for each key supervision gas object based on a preset correspondence between the adjustable computing resources, the count of users of the gas company corresponding to the key supervision gas object, and the data collection frequency of the gas metering device. The adjustable computing resources may be positively correlated with the data collection frequency of the gas metering device, and the count of users of the gas company corresponding to the key supervision gas object may be negatively correlated with the data collection frequency of the gas metering device.

In some embodiments of the present disclosure, the data collection frequency of the gas metering device may be determined based on the adjustable computing resources allocated to the key supervision gas object, and the count of users of the gas company corresponding to the key supervision gas object, which may cause the batch of gas in the use stage to obtain a relatively great supervision.

In some embodiments of the present disclosure, when the computing resources are sufficient, different batches of gas in various stages of the full-cycle may obtain a relatively great supervision and important gas data may obtain a key supervision, which may effectively prevent the occurrence of the gas accidents.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

What is claimed is:

1. A system for gas supply management of smart gas full-cycle, wherein the system comprises a public user platform, a government safety supervision service platform, a government safety supervision management platform, a government safety supervision sensor network platform, a government safety supervision object platform, and a gas company sensor network platform, the government safety supervision object platform includes a gas company management platform; wherein the government safety supervision management platform is configured to:

obtain a sum of a reference resource consumption and residual computing resources based on a government safety supervision sensor network platform;

in response to determining that the sum of the reference resource consumption and the residual computing resources satisfies a preset requirement, the government safety supervision management platform is further configured to:

generate and send a control instruction to the gas company management platform, wherein the control instruction is configured to obtain target data, the target data includes an actual supervision parameter of the target gas, and the target gas includes all batches of gas under a current supervision;

determine a hazard degree of each of the all batches of gas in the target gas based on the target data and the gas production data of the target gas;

determine a user influence degree of the each of the all batches of gas in the target gas based on the gas production data of the target gas;

determine the importance degree of the each of the all batches of gas in the target gas based on the hazard degree of the each of the all batches of gas and the user influence degree of the each of the all batches of gas; and adjust a gas supply of the at least one of the all batches of gas in the target gas based on the importance degree of the each of the all batches of gas in the target gas and the target data.

2. The system of claim 1, wherein the governmental safety supervision management platform is configured to:

obtain gas production data of at least one of all batches of gas to be supervised uploaded by a gas company management platform in a government safety supervision object platform based on a government safety supervision sensor network platform; and the sum of the reference resource consumption refers to a sum of reference resource consumptions of all batches of gas under the current supervision in a current stage;

determine base supervision data based on the gas production data, wherein the gas production data includes a base supervision parameter and the reference resource consumption; and obtain the residual computing resources at a preset frequency, wherein the preset frequency is determined based on at least one of a total estimated gas production volume, a total gas transportation volume, and a total gas supply volume.

3. The system of claim 1, wherein the governmental safety supervision management platform predicts the hazard degree of the each of the all batches of gas in the target gas through a risk model, wherein the risk model is a machine learning model.

4. The system of claim 1, wherein an influence of the hazard degree of the each of the all batches of gas in the target gas on the importance degree of the each of the all batches of gas is positively correlated with a count of historical accidents that occur in the gas company to which the each of the all batches of gas in the target gas belongs.

5. The system of claim 1, wherein the government safety supervision management platform is configured to adjust the gas supply of the at least one batch of gas in the target gas based on the importance degree of the each of the all batches of gas in the target gas and the target data, including:

determining a computing resource gaps;

obtaining a currently-occupied computing resource of the at least one batch of gas; and in response to determining that a total of currently-occupied computing resources is greater than the computing resource gaps, determining a batch of gas to be adjusted from the at least one of all batches of gas in the preset stage based on the importance degree the each of the all batches of gas, and suspending a supervision of the batch of gas to be adjusted.

6. The system of claim 5, wherein in response to determining that the total of currently-occupied computing resources is not great than the computing resource gaps, the government safety supervision management platform updates a data extraction frequency of each of residual batches of gas based on the importance degrees of the residual batches of gas and the residual computing resources.

7. The system of claim 5, wherein in response to determining that the total of the currently-occupied computing resources is not great than the computing resource gaps, the government safety supervision management platform updates a production parameter of a gas in production based on the computing resource gap and an importance degree of the gas in production, and sending an updated production parameter to a gas production device of the gas in production.

8. The system of claim 1, wherein in response to determining that the sum of the reference resource consumption is not greater than computing resource gaps, the government safety supervision management platform determines the importance degree of the at least one of all batches of gas higher than an importance threshold as a key supervision gas object; and in response to determining that the key supervision gas object is in a production stage, the government safety supervision management platform increases a data collection frequency of a gas concentration detection device for the at least one key supervision gas object that is in the production stage.

* * * * *